(12) United States Patent
Elliott

(10) Patent No.: US 7,958,725 B2
(45) Date of Patent: Jun. 14, 2011

(54) DRIVETRAIN SYSTEM HAVING SIMULTANEOUS DISPLACEMENT CONTROL

(75) Inventor: Christopher Mark Elliott, Apex, NC (US)

(73) Assignee: Caterpillar Inc., Peoria, IL (US)

( * ) Notice: Subject to any disclaimer, the term of this patent is extended or adjusted under 35 U.S.C. 154(b) by 588 days.

(21) Appl. No.: 12/153,563

(22) Filed: May 21, 2008

(65) Prior Publication Data

US 2009/0288406 A1    Nov. 26, 2009

(51) Int. Cl.
F16D 31/02    (2006.01)
(52) U.S. Cl. ......................................... 60/445
(58) Field of Classification Search ............... 60/445
See application file for complete search history.

(56) References Cited

U.S. PATENT DOCUMENTS

| | | | |
|---|---|---|---|
| 3,705,493 A | 12/1972 | Nelson | |
| 3,748,924 A | 7/1973 | Cross et al. | |
| 3,864,991 A | 2/1975 | Nembach | |
| 3,988,893 A | 11/1976 | Bojas et al. | |
| 4,368,638 A | 1/1983 | Groves et al. | |
| 4,399,886 A | 8/1983 | Pollman | |
| 4,401,182 A | 8/1983 | Pollman | |
| 4,566,274 A * | 1/1986 | Heiser et al. | 60/445 |
| 5,582,007 A | 12/1996 | Coutant et al. | |
| 6,209,322 B1 | 4/2001 | Yoshida et al. | |
| 7,243,755 B2 | 7/2007 | Legner | |
| 2006/0150624 A1 | 7/2006 | Shah | |
| 2007/0271913 A1 | 11/2007 | Ikeda | |

* cited by examiner

*Primary Examiner* — F. Daniel Lopez
(74) *Attorney, Agent, or Firm* — Finnegan, Henderson, Farabow, Garrett & Dunner LLP

(57) ABSTRACT

A drivetrain system for use in a mobile machine is disclosed. The drivetrain system may have a first rotary fluid actuator, a second rotary fluid actuator, an input device, and a controller in communication with the first rotary fluid actuator, the second rotary fluid actuator, and the input device. The controller may be configured to determine a desired change in an effective gear ratio of the drivetrain system, and determine a total displacement change associated with the first and second rotary fluid actuators that produces the desired change in the effective gear ratio. The controller may also be configured to compare the total displacement change to a threshold change level, affect simultaneous displacement changes in the first and second rotary fluid actuators when the total displacement change exceeds the threshold change level, and affect sequential displacement changes in the first and second rotary fluid actuators when the total displacement change is less than the threshold change level.

20 Claims, 2 Drawing Sheets

DRIVETRAIN SYSTEM HAVING SIMULTANEOUS DISPLACEMENT CONTROL

TECHNICAL FIELD

The present disclosure relates generally to a drivetrain system and, more particularly, to a drivetrain system having simultaneous displacement control.

BACKGROUND

Machines such as, for example, wheel loaders, on and off-highway trucks, motor graders, and other heavy equipment are used to perform many tasks. To effectively perform these tasks, the machines require an engine that provides significant torque through a drivetrain system to one or more ground engaging devices. The drivetrain system should provide a range of gearing in order to allow the machine to work at different speeds while keeping the engine operating within a desired operating range. For this purpose, the machines commonly include a hydrostatic transmission having a pump and at least one fluid motor connected between the engine and ground engaging devices of the machine.

During operation, the machines can change a travel speed and or a rimpull torque (output torque of the machine at the ground engaging devices) in several ways. The most common way to affect a travel speed or rimpull torque change is by changing a displacement of the pump and/or the motor, while keeping the engine at a substantially constant output. For example, for a given output of the engine and for a fixed displacement of the motor, a larger displacement of the pump may result in a higher travel speed of the machine and a lower torque rotation of the ground engaging devices. Similarly, for the same output from the engine and for a fixed displacement of the pump, a larger displacement of the motor will result in a lower travel speed and a higher torque rotation of the ground engaging devices.

By combining displacement control of both the pump and the motor, a greater range of speed and torque may be obtained as opposed to using only one of the pump and the motor. For example, after increasing the displacement of the pump to a maximum position and thereby increasing machine travel speed, the displacement of the motor can be reduced to a minimum position to further increase the travel speed. Likewise, after increasing the motor displacement to a maximum position and thereby increasing a rimpull torque of the traction device, the displacement of the pump can be decreased to further increase the rimpull torque. In this manner, the sequential displacement changes of the pump and motor can together provide a greater range of travel speed and rimpull torque than could have been achieved by either device alone.

Although a greater range of speed and rimpull torque may be achieved through the use of sequential pump and motor displacement changes, the sequential movements can require a significant amount of time for the changes to be achieved. That is, when moving from, for example, a machine output of maximum speed to a machine output of maximum torque, the motor will displace from its minimum displacement position to its maximum displacement position and then the pump will displace from its maximum displacement position to its minimum displacement position. And, the time it takes for both the pump and the motor to sequentially stroke through their entire displacement ranges can be extensive. These types of extreme displacement changes are common during a directional shift of the machine.

One attempt to improve the responsiveness of a machine having a hydrostatic transmission is described in U.S. Patent Publication No. 2006/0150624 (the '624 publication) by Shah, published Jul. 13, 2006. The '624 publication describes a hydrostatic drive machine having an over-center, variable displacement pump and a single-direction, variable displacement motor. The '624 publication also describes a method of controlling the pump and motor such that a directional shift may be completed quickly without exceeding a predetermined acceleration or jerk limit of the machine.

The process of performing the directional shift described in the '624 publication begins by changing the displacement of the pump from a first setting, at which pressurized fluid from the pump is flowing in a first direction from the pump through the motor, toward a second setting, at which the fluid from the pump is reversed to flow in a second direction opposite the first through the motor. During this adjustment of the pump, the motor can be upstroked to its maximum displacement setting, typically during a point in time at which the pump is at a zero displacement orientation, such that maximum torque is available to the machine at startup in the new direction. As the machine reaches an increased velocity in the new direction, the motor displacement is decreased toward a minimum displacement position, thereby reducing the torque applied to the ground engaging wheels of the machine. By changing the displacement of the motor during the directional displacement change of the pump, the machine is ready to respond to operator commands in the new direction in a shorter period of time than if the motor displacement change did not commence until after the pump directional displacement change had been completed.

Although an improvement during directional shifts of the machine, the method of the '624 publication may provide little benefit during continuous travel of the machine in a single direction. In addition, the method of the '624 publication may have little affect on the displacement changes associated with a drivetrain system having multiple motors when a displacement change of the pump is unnecessary or undesired.

The disclosed drivetrain system is directed to overcoming one or more of the problems set forth above.

SUMMARY

In one aspect, the present disclosure is directed to a drivetrain system. The drivetrain system may include a first rotary fluid actuator having variable displacement and being configured to affect an output of the drivetrain system, and a second rotary fluid actuator having variable displacement and being configured to affect the output of the drivetrain system. The drivetrain system may also include an input device configured to receive a command indicative of a desired output of the drivetrain system, and a controller in communication with the first rotary fluid actuator, the second rotary fluid actuator, and the input device. The controller may be configured to determine a desired change in an effective gear ratio of the drivetrain system based on the received command, determine a total displacement change associated with the first and second rotary fluid actuators that produces the desired change in the effective gear ratio of the drivetrain system, and compare the total displacement change to a threshold change level. The controller may be further configured to affect simultaneous displacement changes in the first and second rotary fluid actuators when the total displacement change exceeds the threshold change level, and affect sequential displacement changes in the first and second rotary fluid actuators when the total displacement change is less than the threshold change level.

In another aspect, the present disclosure is directed to a method of controlling a machine drivetrain. The method may include receiving a command indicative of a desired output of the drivetrain, determining a desired change in an effective gear ratio of the drivetrain based on the received command, and determining a total displacement change of the drivetrain that produces the desired change in the effective gear ratio of the drivetrain. The method may also include comparing the total displacement change to a threshold change level, affecting simultaneous displacement changes in multiple fluid actuators when the total displacement change is greater than the threshold change level, and affecting sequential displacement changes in the multiple fluid actuators when the total displacement change is less than the threshold change level.

DETAILED DESCRIPTION

Figure 1:
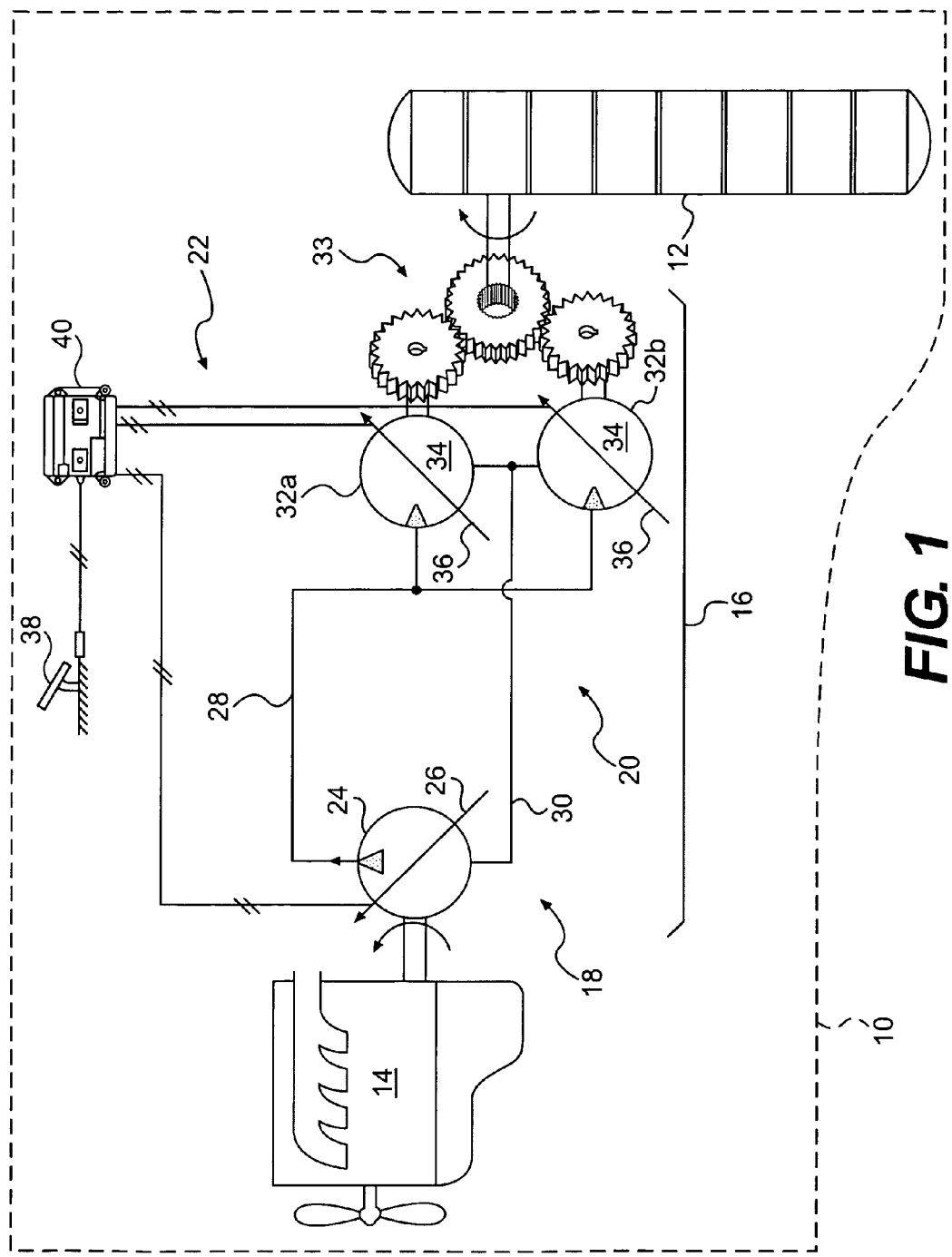
FIG. 1 is a diagrammatic illustration of an exemplary disclosed machine.

FIG. 1 illustrates an exemplary machine 10. Machine 10 may be a mobile machine that performs some type of operation associated with an industry such as mining, construction, farming, transportation, or any other industry known in the art. For example, machine 10 may be a load moving machine such as an on or off-highway truck, a wheel loader, a motor grader, a dozer or any other load moving vehicle. Machine 10 may include at least one traction device 12, a power source 14, and a drivetrain system 16 connecting an output of power source 14 to an input of traction device 12.

Traction device 12 may include one or more tracks located on each side of machine 10 (only one side shown). Alternatively, traction device 12 may include belts, wheels, or other traction devices known in the art. Any of traction devices 12 may be driven and/or steerable.

Power source 14 may produce a mechanical power output and embody an internal combustion engine such as, for example, a diesel engine, a gasoline engine, a gaseous fuel-powered engine, or any other type of engine apparent to one skilled in the art. Power source 14 may alternatively embody a non-combustion source of power such as a battery, a fuel cell, a motor, or any other suitable source of mechanical power.

Drivetrain system 16 may include, among other things, a driving portion 18, a driven portion 20, and a control portion 22. Driving portion 18 may be connected to receive the mechanical power output from power source 14, and convert the mechanical power output to fluid power. Driven portion 20 may be connected to receive the fluid power from driving portion 18 by way of a first passage 28, convert the fluid power back to a mechanical output that propels traction device 12, and return low pressure fluid back to driving portion 18 by way of a second passage 30. Control portion 22 may communicate with driving portion 18 and with driven portion 20 to adjust an effective gear ratio of drivetrain system 16 (i.e., to affect how much of the mechanical power from power source 14 is converted to an input speed and an input torque of traction device 12 in a single travel or rotational direction).

Driving portion 18 may embody, for example, a variable displacement pump. In one example, driving portion 18 may be an over-center variable displacement pump capable of receiving a single input rotation and discharging pressurized fluid in two directions at differing flow rates. In another example, driving portion 18 may be a single-direction variable displacement pump. As a variable displacement pump, driving portion 18 may include a body 24 having one or more bores (not shown), and a piston (not shown) slidably disposed within the bore and biased into engagement with a tiltable plate 26. The piston may reciprocate within its bore to produce a pumping action as body 24 rotates relative to plate 26.

Plate 26 may be tilted to vary an inclination thereof relative to the movement of the piston within the bore. That is, when plate 26 is inclined and rotates relative to body 24, a driving surface of plate 26 may move the piston through a reciprocating motion within its bore. When the piston retracts from its bore, fluid, for example low pressure fuel, may be allowed to enter the bore. When the piston moves back into its bore under the force imparted by plate 26, the piston may force the fluid therein from the bore into passage 28. In this manner, the inclination of plate 26 relative to the bore may be directly related to a displacement of the piston within the bore. And, when plate 26 is tilted from a displaced angle in a first direction through a neutral position (at which plate 26 is substantially perpendicular to the motion of the piston and little, if any, fluid is discharged from driving portion 18) toward a displaced position in a second direction, the fluid discharged from driving portion 18 may flow to driven portion 20 by way of passage 30 and return to driving portion 18 by way of passage 28 (i.e., the flow of fluid within drivetrain system 16 may reverse directions).

Driven portion 20 may include, for example, one or more variable displacement motors 32 mechanically connected to traction device 12. In one example, motor(s) 32 may be connected to traction device 12 by way of a reducing gear train (not shown). In the embodiment shown in FIG. 1, driven portion 20 includes two motors 32a and 32b, both connected to receive fluid from passage 28 in parallel and to drive traction device 12 by way of a gear train 33. Each of motors 32a and 32b, similar to driving portion 18, may include a body 34 having one or more bores (not shown), and a piston (not shown) slidably disposed within each bore and biased into engagement with a tiltable plate 36. As pressurized fluid enters the bore of body 34 from passage 28, the piston may be forced from the bore and against plate 36. As the pressurized fluid exits the bore to passage 30, the piston may be biased back into the bore. When plate 36 is inclined relative to this reciprocating movement of the piston, the force imparted by the piston to plate 36 may create a relative rotation between body 34 and plate 36. In this manner, the inclination of plate 36 relative to the bore may be directly related to a displacement of the piston within the bore of body 34.

Control portion 22 may include components that communicate with driving and driven portions 18, 20 to adjust an effective gear ratio of drivetrain system 16 in response to a requested change in the speed and/or torque output of traction device 12. Specifically, control portion 22 may include an operator input device 38 and a controller 40 in communication with driving portion 18, driven portion 20, and operator input device 38.

Operator input device 38 may produce displacement signals that are indicative of a desired machine performance. In one embodiment, operator input device 38 may include a foot pedal manually displaceable by an operator of machine 10. As an operator manipulates the foot pedal (i.e., displaces the foot pedal away from a neutral position or allows the foot pedal to return toward the neutral position), the operator may expect and affect a corresponding increase or decrease in the effective gear ratio of drivetrain system 16 that results in a corresponding increase or decrease in machine travel speed or rimpull torque for a given power source output. It is contemplated that an operator input device other than a foot pedal such as, for example, a joystick, a lever, a switch, a knob, a wheel, or any other device known in the art, may additionally or alternatively be provided for travel speed and/or torque control of machine 10, if desired. It is further contemplated that the signals indicative of the desired machine performance could alternatively be automatically generated in response to a monitored performance (e.g., a travel speed or a rimpull torque) deviating from an expected performance, if desired.

Controller 40 may embody a single microprocessor or multiple microprocessors that include a means for controlling the operation of drivetrain system 16 in response to the signals received from operator input device 38. Numerous commercially available microprocessors can be configured to perform the functions of controller 40. It should be appreciated that controller 40 could readily embody a general machine microprocessor capable of controlling numerous machine functions. Controller 40 may include a memory, a secondary storage device, a processor, and any other components for running an application. Various other circuits may be associated with controller 40 such as power supply circuitry, signal conditioning circuitry, solenoid driver circuitry, and other types of circuitry.

Figure 2:
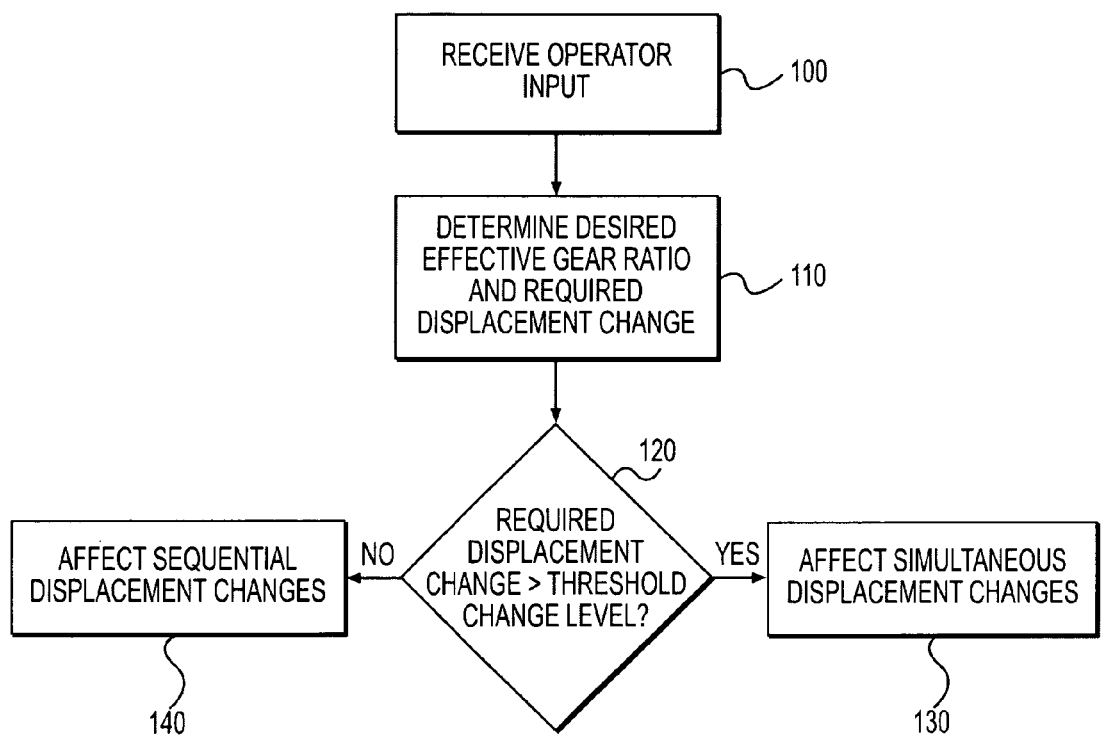
FIG. 2 is a control diagram of an exemplary disclosed method performed by the machine of FIG. 1.

As illustrated in FIG. 2, controller 40 may affect a gear ratio change of drivetrain system 16 in response to operator input. Specifically, controller 40 may receive an input from operator input device 38 (Step 100) and relate that input to the desired effective gear ratio change of drivetrain system 16 and, in turn, determine a total displacement change of drivetrain system 16 (i.e., a displacement change of one or both of driving and driven portions 18, 20) required to implement the desired effective gear ratio change (Step 110). Specifically, controller 40 may include one or more maps stored within an internal memory, and may reference these maps to determine the desired effective gear ratio change for various positions of operator input device 38. In one example, the maps may relate a position signal from operator input device 38 and a real-time performance parameter of power source 14 and/or traction device 12, for example a speed, to the desired effective gear ratio change of drivetrain system 16. Each of these maps may include a collection of data in the form of tables, graphs, and/or equations. The same or additional maps may then be used to determine the total displacement change of drivetrain system 16 required to achieve the desired effective gear ratio change. It is contemplated that a single map may alternatively be used to directly relate signals from operator input device 38 to the total displacement change required of drivetrain system 16, if desired.

Controller 40 may adjust the displacements of one or both of driving portion 18 and driven portion 20 to achieve the total displacement change required of drivetrain system 16. For example, to affect a total displacement change that increases the effective gear ratio of drivetrain system 16 (i.e., that provides a higher travel speed and a lower rimpull torque for a given power source output), controller 40 may increase the displacement of driving portion 18 by a first amount and/or decrease a displacement of driven portion 20 by the same or a different amount. In contrast, to affect a total displacement change that decreases the effective gear ratio of drivetrain system 16 (i.e. that provides a lower travel speed and a higher rimpull torque), controller 40 may decrease the displacement of driving portion 18 by a first amount and/or increase the displacement of driven portion 20 by the same or a different amount.

The amount of displacement change affected by driving portion 18 may or may not be equal to the amount of displacement change affected by driven portion 20. For example, for a total displacement change of about 80%, driving portion 18 could be controlled to affect about 40% of the total displacement change, while driven portion 20 could also be controlled to affect about 40% of the total displacement change (i.e., both driving portion 18 and driven portion 20 could be controlled to change their individual displacements by about the same amount). Alternatively, driving portion 18 could be controlled to affect about 70% of the total displacement change, while driven portion 20 could be controlled to affect only about 10% of the total displacement change (i.e., driving portion 18 may undergo a large displacement change, while driven portion 20 may undergo only a relatively small or no displacement change). Any combination of displacement amounts may be utilized as long as the desired effective gear ratio change is achieved, and the specific combination may be based on a desired responsiveness, ride quality, and/or efficiency of drivetrain system 16.

Controller 40 may change the displacements of driving portion 18 and driven portion 20 simultaneously or sequentially. In particular, in response to the indicated increase or decrease in desired travel speed, controller 40 may change first the displacement of driving portion 18 until an end stop position is achieved (i.e., until either maximum or minimum displacement positions are achieved), and then change the displacement(s) of driven portion 20 until the total displacement change has been achieved or vice versa. Alternatively, controller 40 may change the displacements of driving and driven portions 18, 20 simultaneously to reduce an amount of time required for the total displacement change to be achieved.

Controller 40 may determine if sequential or simultaneous displacement changing should be utilized based on the total displacement change (Step 120). For example, if the total displacement change exceeds a threshold change level, controller 40 may implement simultaneous displacement changes of driving and driven portions 18, 20 (Step 130). In contrast, if the total displacement change is less than the threshold change level, controller 40 may implement sequential displacement changes (Step 140). In this manner, gear ratio changes that might require a large of amount of time may be achieved more quickly through simultaneously displacement changes of driving and driven portions 18, 20 and thereby improve the responsiveness of drivetrain system 16. In one example, the threshold change level may be about equal to the displacement change capacity of one of driving portion 18 and driven portion 20. In another example, the threshold change level may be associated with a desired rate of displacement change (i.e., an amount of time allowed for the required displacement change to take place).

When making the displacement changes described above with respect to driven portion 20, controller 40 may also change the displacements of motors 32a and 32b simultaneously or sequentially and by the same or by different amounts. In particular, in response to the total displacement change exceeding a threshold change level (e.g., a second threshold change level that may or may not be the same as the threshold change level associated with simultaneous control of driving and driven portions 18, 20), controller 40 may change first the displacement of motor 32a until an end stop position is achieved (i.e., until either maximum or minimum displacement positions are achieved), and then change the displacement of motor 32b or vice versa. Alternatively, controller 40 may change the displacements of both motors 32a and 32b simultaneously. In one example, one of motors 32a and 32b may be a primary motor, while the other may be a secondary motor. In this example, the displacement change affected by the primary motor may always be greater than the displacement change affected by the secondary motor. In another example, the displacement changes affected simultaneously by each of motors 32 and 32b may always be about equal.

It is contemplated that the simultaneous displacement changes may only be temporary. That is, when simultaneous displacement changes are instituted to reduce a time required for achieving the desired gear ratio, the end displacement positions of the driving portion 18 and driven portion 20 may be sub-optimal with respect to efficiency. Thus, after the simultaneous displacement changes have been made to achieve the desired gear ratio, they may be slowly readjusted to more efficient settings. In some situations, the more efficient settings may be those settings that would have been achieved had sequential displacement changes been implemented instead of the simultaneous displacement changes.

INDUSTRIAL APPLICABILITY

The disclosed drivetrain system may be applicable to any mobile machine having a hystat transmission where changing the displacements of multiple actuators is time consuming. The disclosed drivetrain system may improve responsiveness of the mobile machine by selectively affecting simultaneous displacement changes in the multiple actuators in response to a desire for a large gear ratio change. When a small change in the effective gear ratio of the hystat transmission is desired, the disclosed drivetrain system may affect sequential displacement changes.

By selectively affecting simultaneous displacement changes in the multiple actuators, the total time required to achieve the large effective gear ratio may be reduced. And, by reducing the total time required to achieve the large effective gear ratio, the mobile machine may be more responsive to operator commands. By selectively affecting sequential displacement changes in the multiple actuators when the desired effective gear ratio is small, a ride quality and/or efficiency of the machine may be improved.

It will be apparent to those skilled in the art that various modifications and variations can be made to the drivetrain system of the present disclosure. Other embodiments of the drivetrain system will be apparent to those skilled in the art from consideration of the specification and practice of the invention disclosed herein. It is intended that the specification and examples be considered as exemplary only, with a true scope of the disclosure being indicated by the following claims and their equivalents.

What is claimed is:

1. A drivetrain system, comprising:
a first rotary fluid actuator having variable displacement and being configured to affect an output of the drivetrain system;
a second rotary fluid actuator having variable displacement and being configured to affect the output of the drivetrain system;
an input device configured to receive a command indicative of a desired output of the drivetrain system; and
a controller in communication with the first rotary fluid actuator, the second rotary fluid actuator, and the input device, the controller being configured to:
determine a desired change in an effective gear ratio of the drivetrain system based on the received command;
determine a total displacement change associated with the first and second rotary fluid actuators that produces the desired change in the effective gear ratio of the drivetrain system;
compare the total displacement change to a threshold change level;
affect simultaneous displacement changes in the first and second rotary fluid actuators when the total displacement change exceeds the threshold change level; and
affect sequential displacement changes in the first and second rotary fluid actuators when the total displacement change is less than the threshold change level.

2. The drivetrain system of claim 1, wherein the simultaneous displacement changes affected in each of the first and second rotary fluid actuators are always about equal.

3. The drivetrain system of claim 1, wherein a total displacement change affected in one of the first and second rotary fluid actuators is always greater than a total displacement change affected in the other of the first and second rotary fluid actuators.

4. The drivetrain system of claim 1, wherein the threshold change level is associated with one of a capacity for displacement change of one of the first and second rotary fluid actuators and a desired rate of displacement change.

5. The drivetrain system of claim 1, wherein the first and second rotary fluid actuators are motors connected to drive a common output.

6. The drivetrain system of claim 5, wherein the first and second rotary fluid actuators are driven by a common pump.

7. The drivetrain system of claim 6, wherein the controller is in further communication with the common pump and configured to:
compare the total displacement change to a second threshold change level; and
affect simultaneous displacement changes in the first and second rotary fluid actuators and in the common pump only when the total displacement change exceeds the second threshold change level.

8. The drivetrain system of claim 1, wherein the first rotary fluid actuator is a motor, and the second rotary fluid actuator is a pump connected to drive the motor.

9. The drivetrain system of claim 1, wherein the desired change in the effective gear ratio of the drivetrain system is associated with a change in a speed or a torque in single rotational direction.

10. The drivetrain system of claim 1, wherein the input device is operator controlled.

11. The drivetrain system of claim 1, wherein the input device is automatically controlled in response to one or more monitored performance parameters of the drivetrain system.

12. A method of controlling a machine drivetrain, comprising:
receiving a command indicative of a desired output of the drivetrain;
determining a desired change in an effective gear ratio of the drivetrain based on the received command;
determining a total displacement change of the drivetrain that produces the desired change in the effective gear ratio of the drivetrain;
comparing the total displacement change to a threshold change level;
affecting simultaneous displacement changes in multiple fluid actuators when the total displacement change is greater than the threshold change level; and affecting sequential displacement changes in the multiple fluid actuators when the total displacement change is less than the threshold change level.

13. The method of claim 12, wherein the simultaneous displacement changes for each of the multiple fluid actuators are always about equal.

14. The method of claim 12, wherein a total displacement change affected in each of the multiple fluid actuators is always different.

15. The method of claim 12, wherein the threshold change level is associated with one of a capacity for displacement change of one of the multiple fluid actuators and a desired rate of displacement change.

16. The method of claim 12, wherein at least one of the multiple fluid actuators is configured to drive at least one other of the multiple fluid actuators.

17. The method of claim 12, wherein the desired change in the effective gear ratio of the drivetrain is associated with a change in a speed or a torque in single rotational direction.

18. The method of claim 12, wherein the command is received from an operator of the drivetrain.

19. The method of claim 12, further including monitoring a performance parameter of the drivetrain system, wherein the command indicative of a desired output of the drivetrain is received when with the monitored performance parameter deviates from an expected value.

20. A mobile machine, comprising:
a combustion engine having a mechanical output;
a traction device having a mechanical input;
a pump driven by the mechanical output of the combustion engine to pressurized fluid;
a first motor having variable displacement and being driven by the pressurized fluid to rotate the mechanical input of the traction device;
a second motor having variable displacement and being driven by the pressurized fluid to rotate the mechanical input of the traction device;
an operator input device configured to receive a command indicative of a desired output of the traction device; and
a controller in communication with the first motor, the second motor, and the operator input device, the controller being configured to:
determine a desired change in a ratio of the mechanical output to the mechanical input;
determine a total displacement change associated with the first and second motors that produces the desired change in the effective gear ratio;
compare the total displacement change to a threshold change level;
affect simultaneous displacement changes in the first and second motors when the total displacement change exceeds the threshold change level; and
affect sequential displacement changes in the first and second motors when the total displacement change is less than the threshold change level.

* * * * *